Dec. 22, 1953    W. H. RAMSELL ET AL    2,663,495
COUNTING EQUIPMENT
Filed Jan. 12, 1951    4 Sheets-Sheet 3

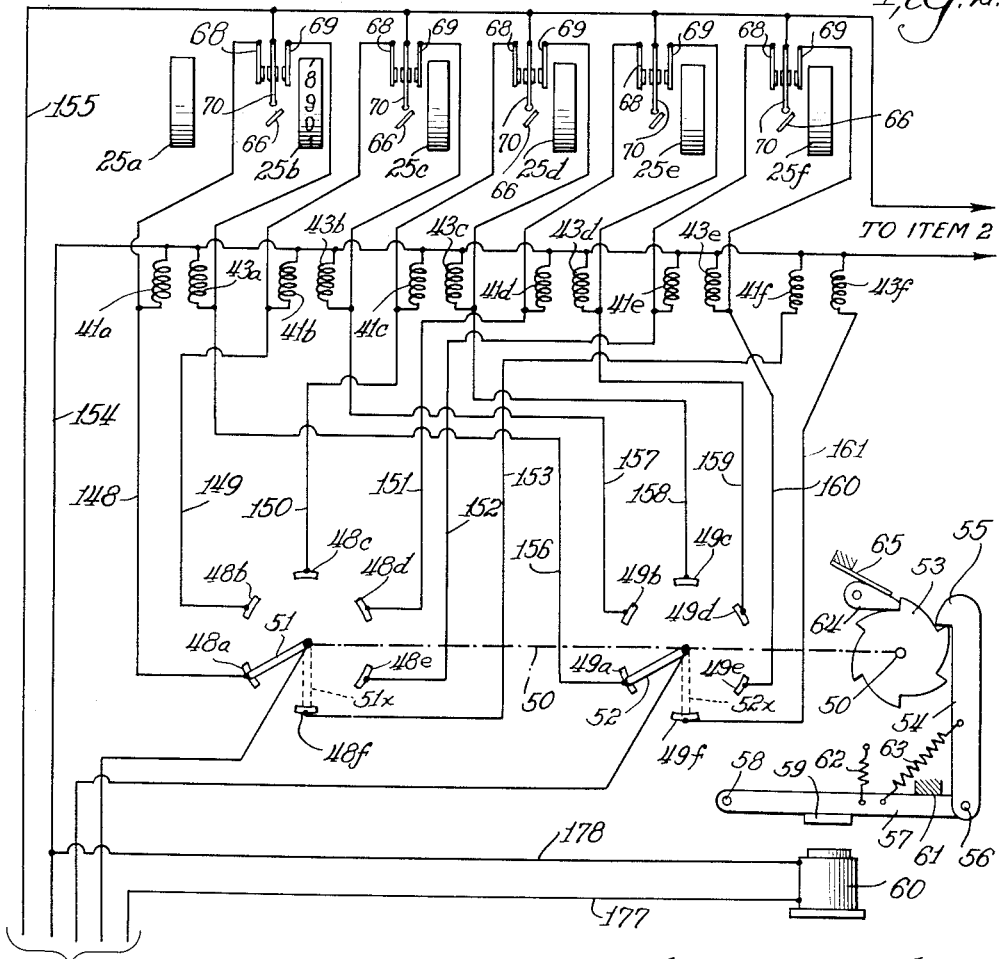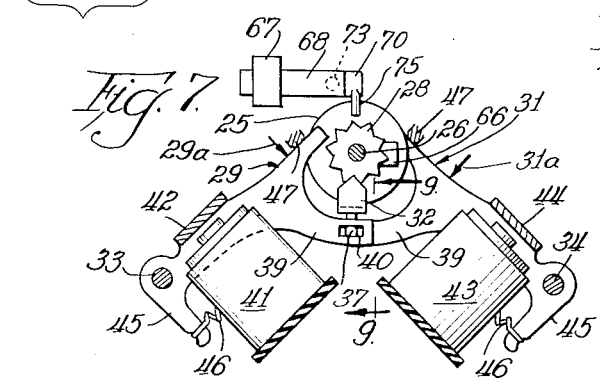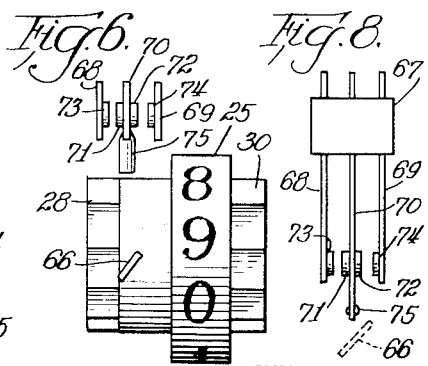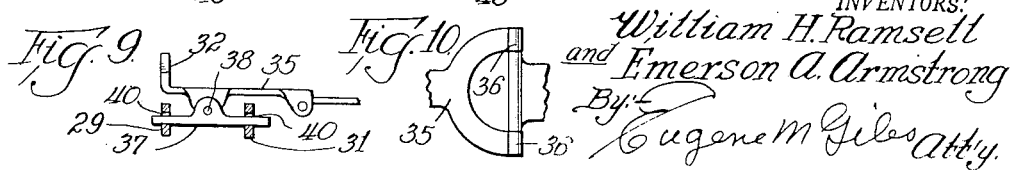

INVENTORS:
William H. Ramsell
and Emerson A. Armstrong
By: Eugene M. Giles  Att'y Dec. 22, 1953  W. H. RAMSELL ET AL  2,663,495
COUNTING EQUIPMENT
Filed Jan. 12, 1951  4 Sheets-Sheet 4

INVENTORS:
William H. Ramsell
and Emerson A. Armstrong
By: Eugene M Giles  Atty.

Patented Dec. 22, 1953

2,663,495

UNITED STATES PATENT OFFICE 2,663,495

COUNTING EQUIPMENT

William H. Ramsell, Palo Alto, Calif., and Emerson A. Armstrong, Western Springs, Ill.

Application January 12, 1951, Serial No. 205,796

2 Claims. (Cl. 235—61)

Our invention relates to facilities for selectively computing and keeping count individually, at one or more places, of a number of different items or things from one or more remote control stations, these facilities being particularly advantageous for such purposes as maintaining a dependable current inventory of a number of different items of manufacture as they are produced and disposed of, and also a current record of unfilled orders or requirements for each item as such orders or requirements are received or arise.

The invention, however, is not limited to such use but is applicable to any business or situation wherein there is constant change in the number or quantity of each of a number of items or things used or involved and it is important or desirable to maintain and display an accurate count of each at all times.

With this invention, a record or count may be readily maintained of the number or quantity of each of any number of items or things and the count of each constantly changed and revised as transactions occur which affect the number or quantity thereof, so that the change or revision is practically contemporaneous with the transaction and an accurate count is accordingly shown at all times. The count may be controlled from any of a number of remote places where the transactions occur or are supervised which result in the increase or decrease in the number or quantity of the items or things involved and the indicated number or quantity of each item may be added to or subtracted from as the particular transaction may require.

Moreover, a number of different counts may be maintained simultaneously, with respect to each item, giving needed information in regard to that item, and these different counts may be located in various places where the information is to be made use of, and at each of these places the count of each item may be displayed so that it is visible at all times.

These objects and advantages of the present invention may be accomplished with facilities such as described hereinafter and shown in the accompanying drawings in which:

Fig. 2 is a diagrammatic view which is typical of each of the counters of Fig. 1 and shows the electrical connections through which the counter wheels of each counter are consecutively operated;

Fig. 6 is a detail view of a counter wheel such as employed in the counters, looking at the peripheral face of the counter wheel and showing part of the mechanism by which the counter wheel operation is effected;

Fig. 7 is a side view of a counter wheel assembly and operating mechanism thereof, this assembly being typical of that provided for each counter wheel except that in certain instances some of the parts shown in this figure are omitted;

Fig. 8 is a top view of the carry-over switch which is associated with each counter wheel, except the first;

Fig. 9 is a side view of the locking device with which each counter wheel is provided, said view being taken on the line 9—9 of Fig. 7.

Fig. 10 is a fragmentary detail view of the pivoted end of the counter wheel lock.

Figure 1:
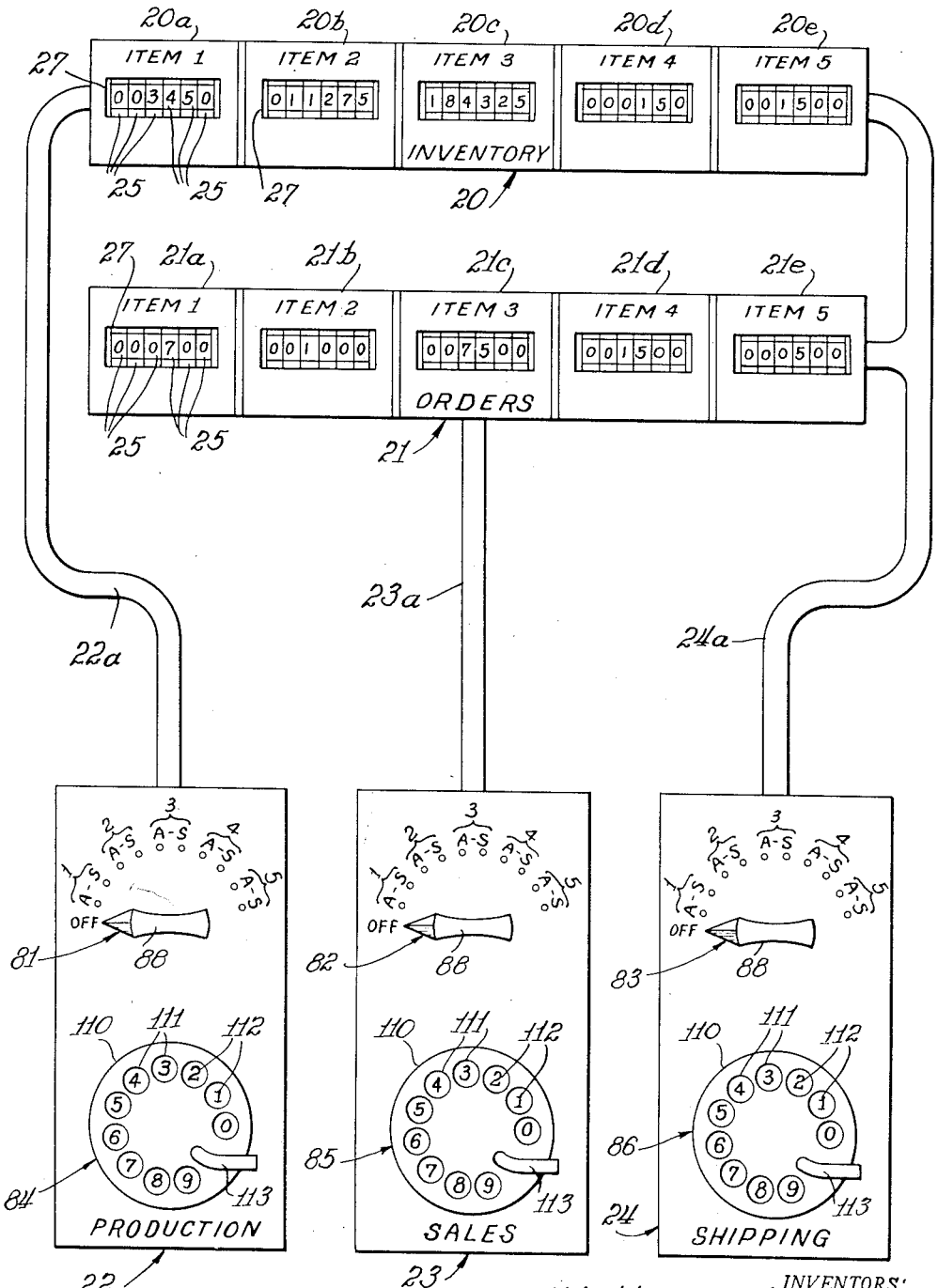
Fig. 1 is a view showing somewhat diagrammatically an arrangement of counters and control stations which may be employed in accordance with our invention.

The particular embodiment of the invention which is shown for illustrative purposes in the drawings is adapted for use in a manufacturing plant to show at all times the number of each of the different items or parts manufactured and on hand and the number of each of the items or parts required for unfilled orders, two sets of counters being employed, one set of which is designated in Fig. 1 of the drawing as "Inventory" and indicated as a whole by the reference numeral 20 and comprises a group of counters, which show the number of each of the parts or items on hand and the other set of which is designated in Fig. 1 as "Orders" and indicated by the reference numeral 21 and comprises a similar group of counters which show the number of each of the parts or items required for unfilled orders.

These two groups of counters are located in any place or places where the information furnished thereby is desired or needed and they are controlled and operated from three stations designated respectively in Fig. 1 as "Production," "Sales" and "Shipping," the Production station which is indicated as a whole by the reference numeral 22 being located in the production department of the plant or where production is supervised, and the Sales station, which is indicated as a whole by the reference numeral 23, being located in the sales department or where the sales are supervised, and the Shipping station, which is indicated as a whole by the reference numeral 24, being located in the shipping department or where outgoing shipments and deliveries are supervised.

The Production station 22 controls and operates the counters of the Inventory group 20 individually to add to the count thereof the amounts of each item as produced and added to stock on hand, and the Sales station 23 controls and operates the counters of the Orders group 21 individually to add to the count thereof the amounts of each item for which new orders or requisitions are received. The Shipping station 24, on the other hand, controls and operates corresponding counters simultaneously in both groups 20 and 21 to subtract from the Inventory count and at the same time from the Orders count of each individual item the number of such items as they are shipped and the inventory and orders therefor thus depleted.

The connections from the Production station 22 to the counters 20 controlled thereby are represented in Fig. 1 at 22a, and the connections from the Sales station 23 to the counters 21 controlled thereby at 23a and the connections from the Shipping station 24 to both counter groups 20 and 21 at 24a, it being understood that each of these connections 22a, 23a and 24a comprises a group of conductors as hereinafter explained.

The number of counters in each of the two groups, Inventory and Orders, is the same and corresponds to the number of items dealt in in the particular industry on which it is desired or necessary to maintain an accurate count at all times and generally there are a large number of such items, but for purposes of illustration counters for only five items are shown, those of the Inventory group 20 being indicated respectively at 20a, 20b, 20c, 20d and 20e and those of the Orders group 21 respectively at 21a, 21b, 21c, 21d and 21e, the counters 20a and 21a being for the same item, and likewise the counters 20b, 20c, 20d and 20e for the same respective items as the counters 21b, 21c, 21d and 21e.

Preferably the counters are all alike, each in the illustrated embodiment having a series of counter wheels 25 arranged in line and each counter wheel having the peripheral face thereof marked with the digits 0 to 9 inclusive uniformly spaced therearound, as shown in part in Fig. 6, the wheels of each counter being mounted to rotate freely on a shaft 26 (Figs. 6 and 7) in a casing which has an elongated window or sight opening 27 through which a single row of aligned digits or numbers of all the numbered wheels of the counter are visible to show the count computed by that counter. In the present illustrated embodiment each counter has six counter wheels 25, although it is to be understood that counters with a greater or smaller number of counter wheels may be employed if desired.

To distinguish the six counter wheels 25 of each counter from one another the counter wheel at the extreme left will be referred to hereinafter as the first counter wheel and the counter wheels successively to the right thereof as the second, third, fourth, fifth and sixth counter wheels respectively, this being the order in which the counter wheels of each counter are actuated as further explained hereinafter.

The counter wheels are all alike and individually operated and each has a 10-point star wheel 28 at one side thereof which is engaged by a pawl 29 to advance the star wheel and the counter wheel attached thereto one step at a time in the counter-clockwise direction, as viewed in Fig. 7, for performing additions to the count, and at its other side each counter wheel 25 has a similar 10-point star wheel 30 correspondingly oriented and engaged by a pawl 31 to advance the star wheel and attached counter wheel one step at a time in the reverse or clockwise direction, as viewed in Fig. 7, for performing subtracting operations.

Adding operations of the counter wheels are effected by the Production and Sales stations 22 and 23, whereas subtracting operations are effected by the Shipping station 24 in the normal operation of the equipment, but at each station the reverse of its normal operation may be performed, as hereinafter indicated, to correct any inaccuracy which may occur in the operating of the counter.

For holding the counter wheel in each successive step by step position thereof, a V-pointed latch 32 is provided which engages in the V-shaped recess between adjoining points or teeth of the star wheel 28 and is retracted during each advance movement of said star wheel. No holding latch is provided for the subtracting star wheel 30 as the counter wheel 25 is held by the latch 32 in the positions to which it is moved by the reversing pawl 31.

Each pawl 29 and 30 is normally retracted from engagement with its respective star wheel and is individually pivoted at its outer end as indicated at 33 and 34 so that the free end thereof swings toward and away from the periphery of the respective star wheel, the free end of the pawl 29 being located, as shown in Fig. 7, so that when it swings inwardly in the direction indicated by the arrow 29a in Fig. 7, it strikes the tip or apex of a tooth of the star wheel 28 at a place between the axis of the counter wheel shaft 26 and the axis of the pawl 33 and thereby turns the counter wheel 25 in the counter-clockwise direction (as viewed in Fig. 7) in which the digits of the counter wheel are moved past the window 27 (see Fig. 1) in the direction from zero to 1 and consecutively from 1 to 9.

As the counter wheel is thus turned, the star wheel tooth next following that engaged by the pawl 29 is brought down against the end face of said pawl and the latter thus serves as a stop to limit the rotation of the counter wheel, the arrangement being such, however, that the counter wheel is advanced somewhat more than one-half a step.

The other pawl 31 is arranged to engage its star wheel 30 and operate the counter wheel 25 in like manner, but its counter wheel operating movement, which is in the direction indicated by the arrow 31a, is the reverse of that of the pawl 29 and it engages a tooth of the star wheel 30 in a manner to rotate the counter wheel 25 in the clockwise direction, as viewed in Fig. 7, thereby bringing the counter wheel numbers or digits successively to the window opening 27 in decreasing value order.

The V-shaped latch 32 above referred to, which holds the counter wheel 25 in each of its successive count recording positions, is at one end of an arm 35 which extends crosswise under the counter wheel and at its other end is horizontally pivoted, preferably at widely separated places as indicated at 36 in Fig. 10, so that the V-shaped latch is retractable downwardly from its engaging position in successive V-shaped recesses of the star wheel 28, and retracting facilities are provided which are operable by either pawl 29 or 31 and timed therewith so that as either pawl is operated to advance the counter wheel 25 respectively in the forward or reverse direction, said latch 32 is simultaneously retracted, and upon return of the then operating pawl 29 or 31 to its normal position, the latch 32 is returned to the latching position in the V-notch next adjoining that from which it has just been retracted.

For operating the latch 32 as aforesaid, the pivoted arm 35 at the end of which the latch is located, has an equalizer 37 pivoted to the underside thereof as at 38, midway between the pawls 29 and 31 and each of the latter has an extension 39 with an opening 40 in which the respective end of the equalizer 37 is loosely engaged, the arrangement being such that when both pawls 29 and 31 are in the retracted position, both ends of the equalizer 37 are held at such elevation that the latch 32 is firmly engaged in a V-shaped notch of the star wheel 28.

When, however, either pawl 29 or 31 is operated in the direction to rotate the counter wheel, the extension 39 thereof, at the same time swings downwardly and rocks the equalizer 37 in the opening 40 of the extension 39 of the other pawl sufficiently to retract the latch 32 from the notch of the star wheel 28 so the latter is free to be turned by the particular pawl 29 or 31 which is in operation at the time.

In such operation by either pawl 29 or 31, the counter wheel 25, as indicated above, is not rotated a full star wheel step but sufficiently more than a half step so that the particular notch of the star wheel 28 from which the latch 32 has been retracted has moved beyond the point of reengagement therewith and a portion of the next succeeding notch of the star wheel is opposite the apex of the latch 32 so that the latter, when returned to the normal latching position, engages and effects such wedging action in such next succeeding notch as to continue the more than half step movement of the counter wheel initiated by the pawl 29 or 31 and thereby complete the step movement of the counter wheel, at the conclusion of which the latch 32 holds the counter wheel 25 in the final full step position until the next operation of either one of the pawls 29 or 31.

Thus it is assured that in any operation of the counter wheel 25 in either the forward or reverse direction, a full step movement thereof occurs in each instance and the digit or number of the counter wheel which is advanced either forwardly or reversely to the sight opening or window 27 of the counter is properly centered and held at the window or sight opening.

For operating the pawls 29 and 31, electromagnets are employed which may be energized from any desired remote location, the electromagnet for the pawl 29 being indicated at 41 and located to cooperate with an armature 42 of the pawl 29 to operate the latter to advance the counter wheel 25 in the adding direction, and the electro-magnet for the pawl 31 being indicated at 43 and located to cooperate with an armature 44 of the pawl 31 to operate the latter to advance the counter wheel in the reverse or subtracting direction.

Each pawl 29 and 31 is provided at its pivoted end with a laterally extending arm 45 having a spring 46 connected therewith by which the respective pawl is normally held in the retracted position and returned to that position after each operation thereof by its respective electromagnet 41 or 43, and it is these springs 46 which serve, through the pawls 29 and 31 and equalizer 37 to cause the latch 32 to engage the notches of the star wheel 28. A stop 47 is provided for each pawl 29 and 30 against which it abuts in the fully retracted position in which the latch 32 is fully engaged in a notch of the star wheel 28.

Each counter wheel 25 of each counter 20a to 20e and 21a to 21e inclusive is individually provided with and operated by a pair of electromagnets 41 and 43 and in each counter operation, the counter wheels 25 of the particular counter that is being operated, are operated consecutively, beginning with the counter wheel at the extreme left, called herein the first, and continuing thereafter with the second, then the third, then the fourth, then the fifth and finally the sixth counter wheels.

For convenience in referring thereto hereinafter the counter wheels of each counter, while referred to and indicated generally by the reference numeral 25 are designated in Fig. 2 in the order of their consecutive operation respectively as 25a, 25b, 25c, 25d, 25e and 25f and in said figure the electro-magnets which effect the adding operations of said consecutively operated counter wheels, while indicated generally by the reference numeral 41, are designated respectively in said Fig. 2 as 41a, 41b, 41c, 41d, 41e and 41f and also in said figure, the electro-magnets which effect the subtracting operations of said consecutively operated counter wheels, while indicated generally by the reference numeral 43, are designated respectively in said Fig. 2 as 43a, 43b, 43c, 43d, 43e and 43f.

For effecting the aforesaid consecutive operation of the counter wheels 25, each counter is individually provided with and connected to a step switch having two circular series of contacts, each series composed of six contacts, one for each counter wheel, the contacts of one series being connected respectively to the adding electro-magnets 41 of the particular counter and the contacts of the other series being connected respectively to the subtracting electro-magnets 43 of that same counter. These step switches are indicated as a whole at 19 in Fig. 3 with the exponents a, b, c, d, e and f added thereto to distinguish the consecutive step switches from one another, and are shown in detail in an exploded manner in Fig. 2, in the latter of which the adding contacts are indicated at 48a, 48b, 48c, 48d, 48e and 48f, and the subtracting contacts at 49a, 49b, 49c, 49d, 49e and 49f.

Each of said step switches may consist, as shown in Fig. 2, of a shaft 50 having a pair of switch arms 51 and 52 thereon which are insulated from one another and in the rotation of the shaft 50 engage consecutively with the contacts of the respective series, the arrangement being such that when the arm 51 is engaged with the contact 48a, the arm 52 is engaged with the contact 49a, and so on throughout the two series and, at the final contacts 48f and 49f of the two series, the respective switch arms 51 and 52 pass, in the next step operation of the switch, to the beginning contacts 48a and 49a respectively of the two series. For reasons explained hereinafter, the switch arms 51 and 52 remain engaged with the respective final contacts 48f and 49f at the conclusion of each operating cycle of the step switch, as indicated by dotted lines at 51x and 52x in Fig. 2, and are advanced to the contacts 48a and 49a at the beginning of each operating cycle of the step switch.

A six step ratchet wheel 53 is secured to the shaft 50 and operated by a pawl 54 to rotate the shaft 59 and attached switch arms 51 and 52 one step at a time, each such step corresponding to the interval between the contacts of the two series, said pawl 54 being provided at one end with a hook 55 to engage with the teeth of the ratchet wheel and being pivoted at the other end, as indicated at 56, to one end of a swinging arm 57 which in turn is pivoted at its other end, as indicated at 58. This swinging arm 57 carries an armature 59 which cooperates with an electromagnet 60 by which the step switch is operated.

The swinging arm 57 is normally retracted against a stop 61 by a spring 62, and another spring 63 connects the pawl 54 with the arm 57 so as to resiliently hold the hook end 55 of the pawl in engagement with the ratchet wheel 53, the latter being held against movement in a direction reverse to that of its pawl operation by a pivoted latch 64 which is held by the spring 65 in contact with the periphery of the ratchet wheel 53.

Thus whenever the electro-magnet 60 is energized, the ratchet wheel 53 and switch arms 51 and 52 are advanced one step, and successive energizing of the electro-magnet moves the switch arms 51 and 52 into successive engagement with their respective contacts. These contacts, as above explained, serve to effect operation of the counter wheels consecutively, beginning with the counter wheel at the extreme left, and as there are six contacts in each series and six counter wheels in the counter, all of which are operated consecutively in each counter operation, the switch arms 51 and 52 will make a complete revolution and return to the same starting position in engagement with the same contacts after each counter operation and thus be ready to effect the same consecutive operation of the counter wheels of the counter when it is next operated. As above indicated, the starting position in which the switch arms 51 and 52 are left at the conclusion of each counter operating cycle is as indicated at 51x and 52x in Fig. 2.

For interrelating the operation of the counter wheels of each counter for carry-over from each counter wheel to the counter wheel immediately preceding, the necessary one digit movement of the latter counter wheel for each ten count completed by its immediately succeeding counter wheel (either in adding or subtracting), each counter wheel of each counter (except the last counter wheel at the left of the counter) is arranged so that at the appropriate place in each complete revolution thereof, it will cause energization of the appropriate electro-magnet 41 or 42 of the next preceding counter wheel to effect a one step movement to that next preceding counter wheel in the appropriate direction corresponding to the particular counter operation—that is, addition or subtraction—that is being performed at the time.

To this end, each counter wheel, except the last one to the left of each counter, is provided with a deflector 66 at one side thereof inclined to the plane of the counter wheel so as to deflect a part engaged thereby toward or away from the side of the counter wheel, depending on the direction of movement of the counter wheel, and a switch is provided at each of said counter wheels for operation by the respective deflector 66.

Each said switch comprises an insulating block 67 supporting three leaf spring switch arms 68, 69 and 70 the center one of which has near its free end contacts 71 and 72, as shown in Figs. 6 and 8, on the opposite sides which are engageable respectively with matching contacts 73 and 74 respectively on the free ends respectively of the switch arms 68 and 69. Each center switch arm 70 has a depending finger 75 at its free end in the path of movement of the deflector 66 of one of the counter wheels and arranged so that in addition operation of the counter wheel the deflector deflects the switch arm 70 to contact the switch arm 68 as the 9 digit of the counter wheel moves beyond the sight window 27 and is succeeded at the window by the 0 digit in the adding operation of the counter, whereas in subtracting operations of the counter wheel the deflector 66 deflects the switch arm 70 to contact the switch arm 69 as the 0 digit of the counter wheel moves beyond the sight window 27 and is succeeded at the window by the digit 9.

As there is no counter wheel preceding the first counter wheel of each counter, there can be no carry-over from the first counter wheel to any preceding counter wheel either in adding or subtracting and accordingly no carry-over switch 68, 69, 70 is provided in connection with the first counter wheel of any of the counters.

Thus the counter wheel assembly of Figs. 6 and 7 is typical of every counter wheel of every counter, except the first counter wheel of each counter, and it is typical of said first counter wheels except that the first counter wheels are not provided with switches 68, 69, 70 and the deflector 66 by which the switch is operable.

Each of the control stations from which the various counters are operable is provided with two separate devices, one of which is referred to hereinafter as the selector and serves to select the particular counter for operation and also the particular operation, whether addition or subtraction, to be performed by the selected counter, and the other of which is referred to hereinafter as the actuator and serves to transmit to the selected counter the impulses by which the operation of the counter is effected.

These two devices, while separate entities structurally are interconnected electrically and may be incorporated in the same station unit, as represented in Fig. 1, wherein the selectors of the stations 22, 23 and 24 are indicated as a whole respectively at 81, 82 and 83 and the actuators thereof are indicated as a whole respectively at 84, 85 and 86.

The selectors may be of any desired type and with selection facilities to set up connections to any number of counters individually as the particular business or purpose for which the equipment is employed may require. In the illustrated embodiment counters for only five items or things are shown and accordingly the selectors have only five counter selections.

Figure 3:
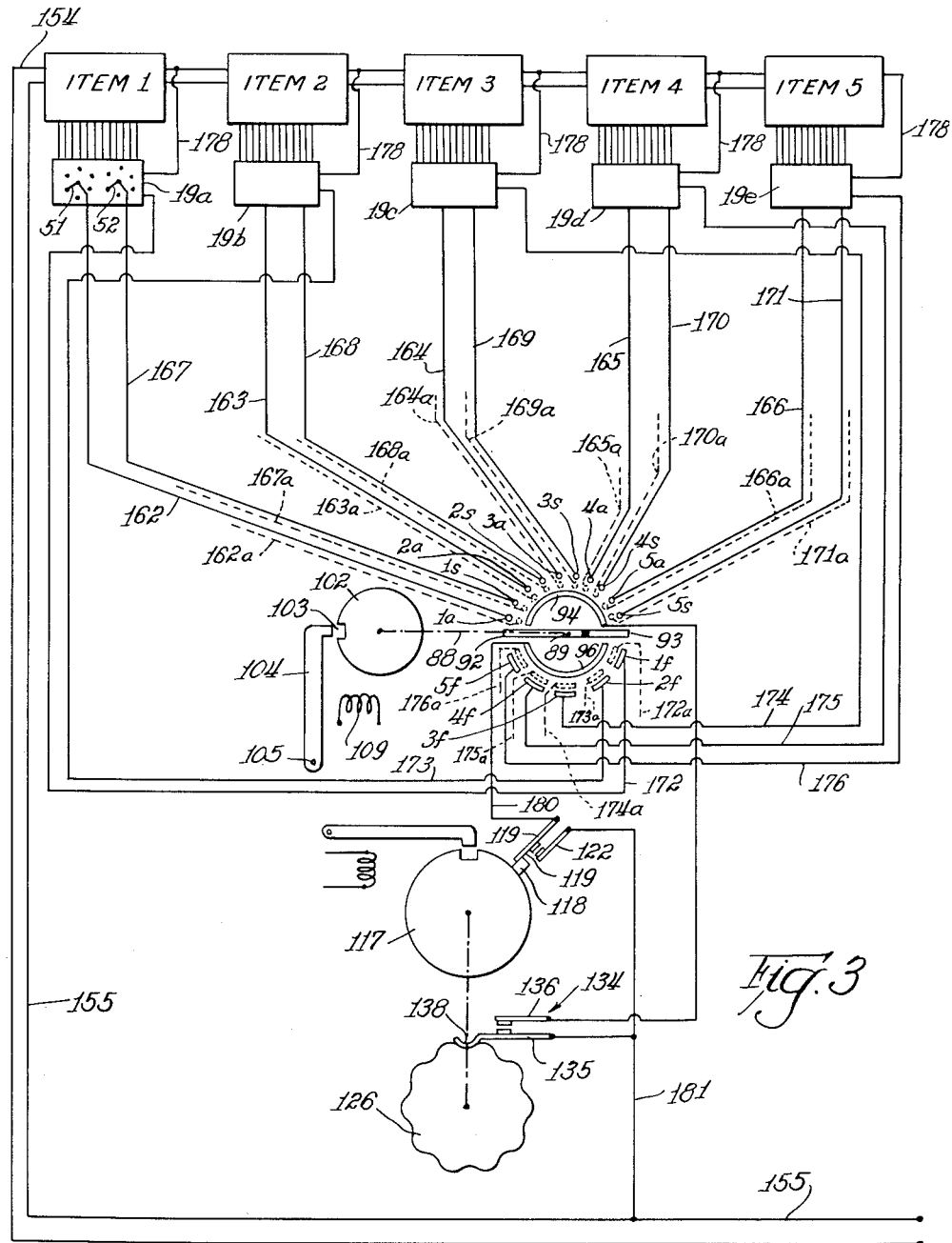
Fig. 3 is a diagrammatic view showing the manner in which the individual counters of Fig. 1 are selected and operated.
Figure 5:
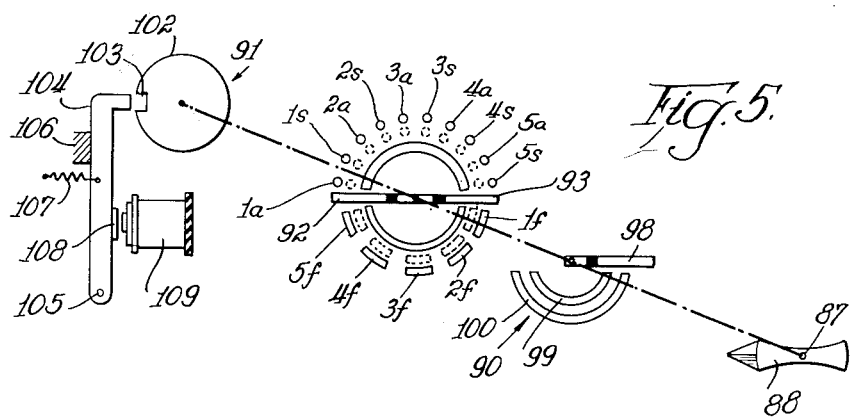
Fig. 5 is an exploded view of the selector which is provided at each control station to select the particular counter to be operated and the particulator operation to be performed by the selected counter—whether addition or subtraction.

Details of these selectors are shown in Fig. 5 and in part in Fig. 3 and each comprises a rotatable shaft or stem 87 with an operating handle 88 at one end and a switch arm 89 which is operable with the shaft and capable of making only a half turn to engage contacts by which the proper selections and connections are made. In addition each shaft 87 has locking controls associated therewith and indicated as a whole at 90 by which other stations are locked against use when any one of the stations is in use and also a locking device, indicated as a whole at 91, by which the selector is locked against use when another station is in use.

The switch arm 89 is double ended in the respect that it has a central insulating part which is directly attached to the shaft 88 and this part has an extension at each end of conductive material and insulated from one another. One of these extensions is indicated at 92 and in the permissible half turn movement of the shaft 88 engages contacts which establish connections with the electro-magnets 41 or 43 of the particular counter selected for operation, while the other extension, which is indicated at 93, during that same half turn of the shaft 88 engages contacts and establishes connections through which the step switch (shown in Fig. 2) of the selected counter is operated.

The contacts by which the switch arm extension 92 establishes connections with the electro-magnets of the selected counter comprise an arcuate contact 94 which is continuously engaged by the extension 92 throughout the permissible half turn movement of the shaft 88 and an arcuate series of ten separate contacts located radially beyond the contact 94 and consecutively engageable by the extension 92 in the half turn movement thereof. These contacts are designated respectively in the order of their consecutive engagement as 1a, 1s, 2a, 2s, 3a, 3s, 4a, 4s, 5a and 5s, and the contacts numbered 1, 2, 3, 4 and 5 are connectible respectively with the electro-magnets of either the counters 20a, 20b, 20c, 20d and 20e or the counters 21a, 21b, 21c, 21d and 21e as hereinafter explained, the contacts whose numbers have the exponent a being connectible to the electro-magnets 41 which perform additions and the counters whose numbers have the exponent s being connectible to the electro-magnets 43 which perform substractions.

The handle 88 of each selector at stations 22, 23 and 24 (Fig. 1) has a pointer at one end which, in the half revolution of the shaft 87, moves along markings corresponding to and indicating the above mentioned ten consecutive contact positions of the switch arm extension 92 so that the operator may readily adjust the selector to any one of the ten consecutive contact positions.

The selector 81 of station 22 establishes connections only with the counters 20a, 20b, 20c, 20d, and 20e of the Orders group and the selector 82 of station 23 establishes connections only with the counters 21a, 21b, 21c, 21d and 21e of the Inventory group, whereas the selector 83 of station 24 establishes connections with the counters of both groups, and for the purpose of establishing independent connections for each group which are necessary to maintain group independence for separate group operation through the selectors 81 and 82, the selector 83 of the Shipping station 24 differs from the selectors of stations 22 and 23 in the respect that it has a second row or arcuate series of ten contacts, shown in dotted lines in Figs. 3 and 5 in a location between the arcuate contact 94 and the series of contacts 1a, 1s, 2a, 2s, 3a, 3s, 4a, 4s, 5a and 5s. These contacts of said second row correspond serially or are paired respectively with the contacts of the other row or series so that when the switch arm extension 92 engages any contact of the outer row or series it at the same time engages a corresponding contact of the inner row or series. For identification the contacts of the inner row will be referred to individually by the same reference numeral applied to the corresponding contact of the outer series but distinguished therefrom by qualification as a contact of the inner row or series.

Each selector 81, 82 and 83 also has an arcuate contact 96 which is continuously engaged by the extension 93 of the switch arm 89 throughout the permissible half turn movement of the shaft 88 and an arcuate series of five separate contacts located radially beyond the contact 96 and consecutively engageable by the extension 93 in the half turn movement thereof. These five contacts which selectively establish connections with the step switches of the counters, and are indicated respectively at 1f, 2f, 3f, 4f and 5f are of such length that the extension 93 is engaged with each during engagement of the extension 92 with two successive contacts, as for example, the contact 1f being engaged by the extension 93 when the extension 92 is engaged with either of the contacts 1a or 1s, and with the contacts 2f, 3f, 4f and 5f respectively when the extension 92 is engaged with contacts 2a or 2s, 3a or 3s, 4a or 4s and 5a or 5s.

The selector 83 of the Shipping station 24 also has a second row or arcuate series of 5 contacts, shown in dotted lines in Figs. 3 and 5 in a location between the arcuate contact 96 and the series of contacts 1f, 2f, 3f, 4f and 5f, which correspond serially or are paired respectively with said contacts of the other row or series so that when the switch arm extension 93 engages any contact of the outer row or series, it at the same time engages a corresponding contact of the inner row or series. For identification the contacts of the inner row will be referred to individually by the same reference numeral applied to the corresponding contacts 1f, 2f, 3f, 4f or 5f of the outer series but distinguished therefrom by qualification as a contact of the inner row or series.

The switch arm 89 has an off position as indicated in Figs. 3 and 5 in which there is no engagement thereof with any of the contacts with which it cooperates, and in which the selector is normally maintained, and at each station 22, 23 and 24 there is an "off" marking with which the pointer of the handle 88 cooperates for setting the respective selector in the off position.

The locking controls 90 above referred to comprise a switch arm 98 which is secured on the selector shaft 88 and in the half turn movement of the shaft engages two arcuate contacts 99 and 100 and maintains such engagement throughout that range of movement of the shaft 88 in which there is contact of the switch arm 89 with its contacts. In the "off" position of the selector when there is no engagement of the switch arm 89 with any contacts, the switch arm 98 of the locking controls is in a position out of engagement with the contacts 99 and 100 as shown in Fig. 5.

The locking device 91 of the selector comprises a disk 102 which is fixed on the shaft 87 to rotate therewith, and this disk has a peripheral notch 103 adapted to be engaged by a locking pawl 104 in the "off" position of the selector or prevent operation thereof. This pawl 104 is pivoted at 105 so that the free end swings to and from the position of locking engagement with the disk 102 and is normally held in the retracted position against a stop 106 by a spring 107.

For operating this pawl 104 the pawl 104 is provided with an armature 108 located in proximity to an electro-magnet 109 which, when energized, operates the pawl 104 against the tension of the spring 107 to engage the notch 103 of the disk 102 and prevent operation of the selector.

Referring now to the counter actuators 84, 85 and 86 by which the impulses are transmitted which operate the counters, these are preferably of dial type similar to those commonly used in automatic telephone systems to selectively connect one telephone with another, although they may be of other type, and each has a rotatable circular plate 110, hereinafter referred to as the dial, with a circular series of 10 openings 111 near the periphery and adapted to be engaged by the finger of the operator for rotating the dial.

Under the dial 110 a circular series of stationary numbers from 0 to 9 inclusive, which are indicated by the reference numeral 112 and are arranged consecutively in the order of increasing value in a counter-clockwise direction, as shown in Fig. 1 and located respectively directly under the openings 111 in the normal position of the dial plate 110. A stationary finger stop 113 is located over the dial 110 between the 0 and 9 numbers to determine the extent of each dialing operation and for reasons hereinafter explained, this dial stop is located closer to the 0 marking than the distance between consecutive numbers.

Figure 4:
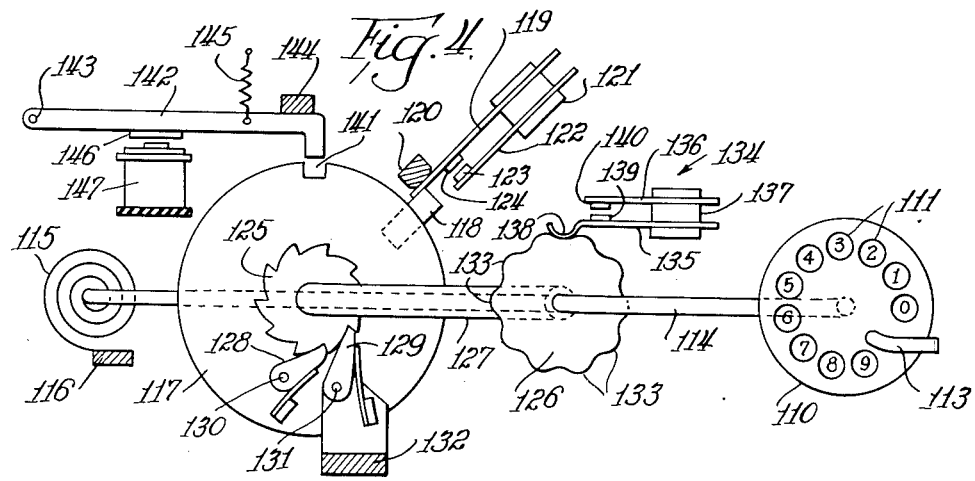
Fig. 4 is an exploded view of the counter actuator which is provided at each control station for operating the counters.

Each dial 110 is secured, as indicated in Fig. 4, to the end of a shaft 114 to which a helical spring 115 is connected at its inner end, the outer end of said spring being fixedly secured as at 116 in a position to maintain a tension on the shaft 114 to rotate it and the attached dial 110 in a counter-clockwise direction, and a disk 117 which is secured to the shaft 114 has a radially projecting finger 118 at the periphery which is engaged, by the tension of the spring 115, against the end of a leaf spring switch arm 119 which in turn is thereby engaged with a fixed stop 120 which limits the counter-clockwise movement of the shaft 114 by the spring 115 and determines the normal position of the dial 110, this being the position of the dials 110 as shown in Fig. 1.

When it is desired to operate the counter actuator, the finger (or an instrument which may be provided for the purpose) is engaged in that opening 111 of the dial which is directly over the particular number 112 which is to be dialed, and the dial is rotated in a clockwise direction until the finger or instrument in the opening 111 engages the finger stop 113. This operation increases the tension of the spring 115 and upon release of the finger or instrument from the opening 111 the dial 110 returns to the normal position engaging and deflecting the switch arm 119 against the stop 120.

This switch arm 119 is part of a switch assembly which operates the step switch of the selected counter to effect consecutive operation of the counter wheels, and comprises an insulating block 121 in which the outer end of the switch arm 119 is secured, and also another leaf spring switch arm 122 likewise secured in said insulating block 121 and insulated from the switch arm 119, the latter switch arm having at its free end a contact 123 which is adapted to engage a contact 124 on the switch arm 119 to close a circuit.

In the normal position of the dial 110 the contacts 123 and 124 are separated, as shown in Fig. 4, but upon each operation of the dial 110 and release thereby of the finger 118 of the disk 117 from engagement with the end of the switch arm 119, the contacts 123 and 124 immediately close together and remain closed until the dial 110 returns again to the normal position.

A ratchet wheel 125 and a cam wheel 126 are mounted on the shaft 114 to rotate freely thereon and interconnected as at 127 to rotate in unison, the ratchet wheel being engaged by two spring pressed pawls 128 and 129, the former of which is pivoted as at 130 to the disk 117 and the pawl 129 being pivoted at 131 to a fixed support 132, the arrangement being such that when the dial 110 is operated in the clockwise direction and the disk 117 rotated therewith, the pawl 129 holds the ratchet wheel 125 against rotation and the pawl 128 rides over one or more ratchet teeth, depending upon the amount of turning movement imparted to the dial 110. When the dial 110 is released and is returned by the spring 115 to normal position, the pawl 128 engages behind the last ratchet wheel tooth over which it has ridden in the clockwise movement of the dial 110 and rotates the ratchet wheel 125, and the cam wheel 126 in a counter-clockwise direction a distance equal to the peripheral length of the number of ratchet wheel teeth over which the pawl 128 has ridden in the clockwise movement of the dial 110, and at the same time the ratchet wheel teeth ride past the fixed pawl 129 to the next position of holding engagement of the ratchet wheel with said pawl 129.

The ratchet wheel 125 has ten ratchet teeth uniformly spaced therearound and corresponding to the consecutive arrangement of the dial numbers 112 so that the number of ratchet teeth advanced by each operation of the dial 110 is the same as that of the particular number 112 under the dial opening 111 which is engaged by the finger or instrument for operating the dial.

Thus, if the finger or instrument is engaged in the dial opening 111 directly over the number "3" of the dial numbers 112 and rotated in the clockwise direction until the finger or instrument strikes the finger stop 113, then the return movement of the dial 110 to normal position will rotate the ratchet wheel 125 a distance of three ratchet teeth.

It is to be noted in this connection that the first number "0" of the consecutive numbers 112, in the normal position of the dial 110, is at such distance from the finger stop 113 that the permissible movement of the dial 110 by the finger or instrument engaged in the opening directly above the number "0" is less than the distance between the consecutive numbers 112 and correspondingly less than a one tooth distance on the ratchet wheel 125 and accordingly such movement or operation of the dial 110 causes no movement of the ratchet wheel 125.

Such movement or operation of the dial from the "0" position is sufficient, however, to cause sufficient movement of the disk 117 to retract the finger 118 from the switch arm 119 and permit closing together of the contacts 123 and 124 and it is to be understood therefore that these contacts are closed together at the inception of each and every operation of the dial 110.

The cam wheel 126 is of undular peripheral contour with ten rounded cam projections 133 spaced at equal intervals therearound and corresponding to the ten ratchet teeth of the ratchet wheel 125, so that whenever the dial 110 is operated and the ratchet wheel 125 is advanced thereby a distance of a number of teeth determined by the particular opening 111 of the dial and the particular number thereunder selected for the operation of the dial, the same number of cam projections 133 of the cam wheel 126 will pass a given point. In other words the distance of cam wheel movement, measured in terms of cam projections 133, which is imparted to the cam wheel 126 in each operation of the dial 110 is the same as the particular number of the series of numbers 112 selected for each such operation of the dial 110.

This cam wheel 126 operates a switch which is indicated as a whole at 134 and composed of two leaf spring switch arms 135 and 136, both of which are secured to an insulating block 137 and insulated from one another.

The switch arm 135 has at its free end a rounded lateral offset 138 which occupies a depression between cam projections 133 of the cam wheel 126 in the normal position of the dial 110 and in the rotation of the cam wheel 126 is deflected outwardly together with the switch arm 135 as each cam projection 133 passes thereunder.

Thus the number of times the switch arm 135 is deflected outwardly in each operation of the dial 110 depends upon the particular distance of movement of the dial 110 in each operation as the number of ratchet tooth advances imparted to the ratchet wheel 125 and the number of cam projection advances correspondingly imparted to the cam wheel 126 is determined by the particular opening 111 of the dial engaged by the finger or instrument for each operation.

If, for example, the dial 110 is operated by the finger or instrument engaged in the opening 111 above the numeral "3" and the dial moved until the finger or instrument engages the finger stop 113, the cam wheel 126 will be advanced a distance of three cam projections 133 and the switch arm 135 will be deflected three times. Thus the number of deflections of the switch leaf 135 occurring in each operation of the dial corresponds to the number under the particular opening 111 that is engaged to operate the dial.

It is to be noted in this connection that upon completion of each operation of the dial 110 the cam wheel 126 comes to rest in a position in which the offset 138 of the switch arm 135 is in a depression between cam projections, and it is to be noted further that by reason of the fact that operation of the dial 110 by the finger or instrument engaged in the opening 111 above the "0" number does not advance the ratchet wheel 125 there is likewise no advance of the cam wheel 126 and deflection of the switch arm 135 in such dial operation.

The switch arm 135 has a contact 139 on its outer face which engages a contact 140 on the switch arm 136 upon each deflection of the switch arm 135 by a cam projection 133 of the cam wheel 126, these contacts being normally separated and adapted to separate after each deflection of the switch arm 135 by a cam projection 133. Thus the number of times the contacts 139 and 140 are closed together in any operation of the dial 110 corresponds to the particular number under the opening 111 that is engaged for operation of the dial.

For locking the actuator against operation when another station is in use, the disk 117 has a notch 141 in the periphery engageable by a locking projection on the end of a pawl 142 which is pivoted at 143 and normally retracted against a stop 144 by a spring 145 to leave the disk 117 free to rotate. The pawl 142 has an armature 146 thereon cooperatively positioned for operation by an electro-magnet 147 by which the pawl is operated to lock the disk when another station is in use.

Each one of the counters 20a, 20b, 20c, 20d and 20e of the Inventory group and each of the counters 21a, 21b, 21c, 21d and 21e of the Orders group is an independent and independently operable unit having as a part thereof a step switch such as shown in the lower half of Fig. 2 which establishes connections consecutively to the adding electro-magnets 41 of the six counter wheels of the counter and at the same time likewise establishes corresponding connections consecutively to the subtracting electro-magnet 43 of the counter, only one set of wheels, however, is energizable at a time.

To effect these consecutive connections each counter has conductors 148, 149, 150, 151, 152 and 153 leading respectively from the contacts 48a, 48b, 48c, 48d, 48e and 48f of its step switch to the adding electro-magnets 41a, 41b, 41c, 41d, 41e and 41f of that counter, as shown in Fig. 2, and connected to what we shall consider and refer to as the positive terminals of the electro-magnets. The other terminals of said electro-magnets, which we shall consider and refer to hereinafter as the negative terminals, are all connected to the same conductor which is indicated in Fig. 2 at 154 and will be considered and referred to hereinafter as the return or negative wire of the current supply line.

Each conductor 148, 149, 150, 151 and 152 is continued beyond its connection with its respective electro-magnet and connected with the switch arm 68 at the counter wheel next following that operated by the electro-magnet to which the conductor is connected, as shown in Fig. 2. The first counter wheel 25a has no switch arm 68, and the conductor 148 of the electro-magnet 41a of said first counter wheel is continued to connect with the switch arm 68 of the second counter wheel 25b whereas the conductor 153 terminates at its electro-magnet 61f and has no continuation therebeyond. All of the switch arms 70 with which the switch arms 68 cooperate are connected with a conductor which is indicated in Fig. 2 at 155 and will be considered and referred to hereinafter as the feed or positive wire of the current supply line.

Each counter also has conductors 156, 157, 158, 159, 160 and 161 leading respectively from the contacts 49a, 49b, 49c, 49d, 49e and 49f of its step switch to the subtracting electro-magnets 43a, 43b, 43c, 43d, 43e and 43f of that counter and connected to the positive terminals thereof and the other or negative terminals of all said electro-magnets are connected to the return wire 154.

Each conductor 156, 157, 158, 159 and 160 is continued beyond its connection with its respective electro-magnet and connected with the switch arm 69 at the counter wheel next following that operated by the electro-magnet to which the conductor is connected, as shown in Fig. 2. The first counter wheel 25a has no switch arm 69 and the conductor 161 of the electro-magnet 43a of said first counter wheel is continued to and connected with the switch arm 69 of the second counter wheel 25f, whereas the conductor 166 terminates at its electro-magnet 43f and has no continuation therebeyond. As before indicated, the switch arms 70 with which the switch arms 69 cooperate are connected with the feed wire 155.

The arrangement of Fig. 2 is typical of each of the Inventory counters 20a, 20b, 20c, 20d and 20e, and also of the Orders counters 21a, 21b, 21c, 21d and 21e, all of which have the negative terminals of all their adding electro-magnets 41 and also of their subtracting electro-magnets connected with the return wire 154 and all of which counters have their switch arms 70 connected with the feed wire 155.

The selector 81 at the Production station 22 is connected with the step switch 19a, 19b, 19c, 19d and 19e respectively of the counters 20a, 20b, 20c, 20d and 20e of the Inventory group 20 by a set of connections such as indicated in Fig. 3, and the selector 82 at the Sales station 23 is connected with similar step switches of the counters 21a, 21b, 21c, 21d and 21e by a similar set of connections. One set only of such connections is shown in Fig. 3 which is typical of both sets.

Accordingly the counters in Fig. 3 which are marked Item 1, Item 2, Item 3, Item 4 and Item 5, may be considered either as counters 20a, 20b, 20c, 20d and 20e respectively and the selector as the selector 81 or said illustrated counters may be considered as counters 21a, 21b, 21c, 21d and 21e and the selector as the selector 82. The step switch of these counters are indicated in said Fig. 3 at 19a, 19b, 19c, 19d and 19e and are connected in the manner explained above in connection with Fig. 2, respectively to the first, second, third, fourth and fifth counters.

As indicated in Fig. 3, conductors 162, 163, 164, 165 and 166 lead respectively from the contacts 1a, 2a, 3a, 4a and 5a of the selector to the respective step switches 19a, 19b, 19c, 19d and 19e, each conductor being connected to the switch arm 51 of its respective step switch and conductors 167, 168, 169, 170 and 171 lead respectively from the contacts 1s, 2s, 3s, 4s and 5s of the selector to the respective step switches 19a, 19b, 19c, 19d and 19e and each is connected to the switch arm 52 of its respective step switch.

There are also five conductors 172, 173, 174, 175 and 176 which lead respectively from the contacts 1f, 2f, 3f, 4f and 5f of the selector switch to the respective step switches 19a, 19b, 19c, 19d and 19e and are connected to the positive terminal of the respective step switch electro-magnet 60 (see Fig. 2). The conductor indicated at 177 in Fig. 2 is representative of any one of the aforesaid conductors 172, 173, 174, 175 or 176.

Each electro magnet 60 has a conductor 178 leading from the negative terminal thereof to the return wire 154 of the current supply line.

A conductor 179 leads from the arcuate contact 94 of the selector to the switch arm 136 of the counter actuator at the particular station 22 or 23 where the counter selector is located and a conductor 180 leads from the arcuate contact 93 of the selector to the switch arm 119 of the same counter actuator. The companion switch arm 122 of the switch arm 119 and the companion switch arm 138 of the switch arm 136 are both connected by the conductor 181 with the feed wire 155.

The counter selector 83 of the Shipping station 24 is exactly the same as and is connected to one group 20 or 21 of counters in exactly the same manner as the selectors 81 and 82, except that said selector 83 has an inner row of contacts corresponding to the contacts 1a, 1s, 2a, 2s, 3a, 3s, 4a, 4s, 5a and 5s, as shown in dotted lines in Figs. 3 and 5 and as hereinbefore explained, which are connected respectively by conductors 162a, 167a, 163a, 168a, 164a, 169a, 165a, 170a, 166a and 171a to the step switches of the counters of the other group in exactly the same manner as said contacts 1a to 5s inclusive are connected to the step switches in Fig. 3. In other words, if the conductors 162 to 171 inclusive from the contacts 1a to 5s inclusive of the selector 83 are connected with the counters of the Inventory group 20, the conductors 162a to 171a inclusive from the inner row of companion contacts are connected with the counters of the Orders group 21.

This counter selector 83 also differs from the selectors 81 and 82 in the respect that it has an inner row of contacts corresponding to the contacts 1f, 2f, 3f, 4f and 5f, as shown in dotted lines in Figs. 3 and 5 and as hereinbefore explained, which are connected respectively by conductors 172a, 173a, 174a, 175a and 176a to the electro magnets 60 of the counters of the other Inventory or Orders group in exactly the same manner as said contacts 1f to 5f inclusive are connected to the electro magnets in Figs. 2 and 3.

In other words if the conductors 172 to 176 inclusive from the contacts 1f to 5f inclusive of the selector 83 are connected with the counters of the Inventory group 20, the conductors 172a to 176a inclusive from the corresponding inner row of companion contacts are connected with the counters of the Orders group 21, it being understood that the contacts 1a to 5s inclusive and contacts 1f to 5f inclusive are connected to one counter group and the inner rows of companion contacts are connected to the counters of the other group.

With the facilities and connections above explained, to operate a counter from any station 22, 23 or 24, the counter selector of that station is first set in the position to select the counter for operation by turning the handle 88 from the "of" position to the place where the pointer of the handle indicates the selected counter and the selected operation of that counter to be performed.

It will be observed that the counter selector markings at each station include two positions for each of the counters 1, 2, 3, 4 and 5—one marked "a" (for addition) and the other marked "s" (for subtraction).

Assuming therefore that at the Production station 22 it is desired to add 165 items on the third item counter 20c of the Inventory counter group, the handle 88 is turned to the position in which the pointer is at the "a" marking opposite the figure 3. This adjustment turns the selector switch 89 so that the extension 92 thereof engages the arcuate contact 94 and also engages the contact 3a, which connects said arcuate contact 94 through the contact 3a with the step switch arm 51 of the third counter 20c of the Inventory group.

Thereupon the dial 84 of station 22 will be operated six times (one time for each counter wheel), in the first 3 operations it will merely be dialed from 0 to the finger stop 113.

This operation from 0 to the finger stop is insufficient to operate the switch arm 136 but sufficient to release the switch arm 119 in each 0 to finger stop operation, and the first operation thereof turns the switch arm 51 from the 48b contact to the 48a contact, then the second operation to the 48b contact and the third operation to the 48c contact.

Thereupon the numbers 1, 6 and 5 are dialed successively, and as the dial operation of the number 1 is started the switch arm 119 is released and the contacts 123 and 126 close together and advance the step switch arm 51 to the 48d contact after which the return dial movement operates the cam wheel 126 a distance of one cam projection 133 and closes the switch 135, 136 once. This transmits a single impulse to the adding electro magnet 41 of the fourth counter wheel of the counter 20c and advances that counter wheel one step in the adding direction.

Then the number 6 is dialed, at the initiation of which operation the step switch arm 51 is moved to the 48e contact, whereupon the return movement of the dial operates the switch 135, 136 six times and impresses six impulses on the electro-magnet 41 of the fifth counter wheel of the counter 20c and advances that counter wheel six steps in the adding direction.

Finally the number 5 is dialed, and in like manner the step switch arm 51 is moved to the contact 48f and five impulses impressed on the adding electro magnet 41 of the last counter wheel of the counter 20c and that counter wheel thereby advanced 5 steps in the adding direction, after which the selector 88 is turned to the "off" position to clear the system for operation by whichever station may be operated next.

If several amounts are to be added (or subtracted) at the particular operating station it is not essential that the selector be returned to the "off" position after each amount has been dialed, as it may be set directly to select another counter, but it is essential to return the operating handle to the "off" position after completion of each interval of use.

Each of the other stations 23 and 24 is operable in like manner, except that operation of the station 23 is impressed only on selected counters of the Orders group 21, whereas operation of the station 24 simultaneously impresses its operation on corresponding counters of both groups 20 and 21.

Connections are provided to energize the electro-magnets 109 and 147 so that, as soon as and during the time that any one station is in use, the counter selector and counter actuator of any other station or stations which would conflict or interfere with such use are locked and operation thereof prevented.

Figure 11:
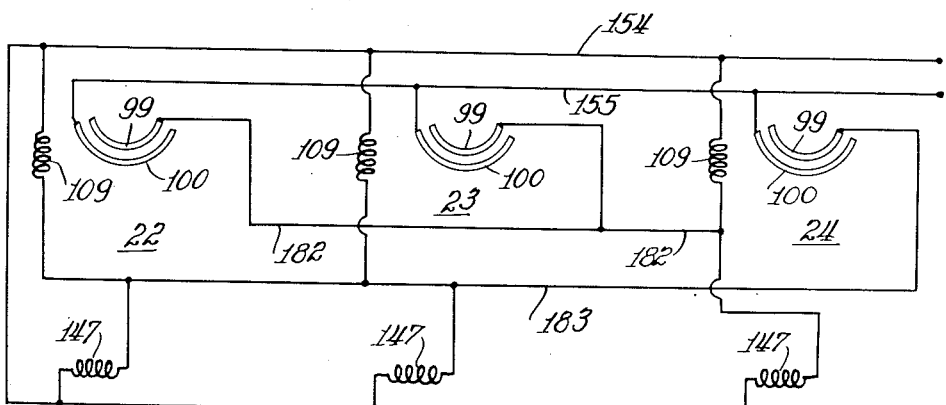
Fig. 11 is a diagrammatic view of the electrical connections and controls by which the operation of any counter selector locks out any other counter selector the actuation which could otherwise conflict or interfere with the operation of the selected counter.

These connections are shown in Fig. 11 in which the reference numerals 22, 23 and 24 indicate respectively the Production station, Sales station and Shipping station locations. As shown in said Fig. 11, the arcuate contact 100 of each station selector is connected with one wire of the current supply, for example, the feed wire 155, and the return wire 154 is connected with the negative terminal of each of the three electro-magnets 109 which operate the selector locking pawls 104 respectively of the stations 22, 23 and 24 and said return wire 154 is also connected to the negative terminal of each of the three electro-magnets 147 which operate the actuator locking pawls 142 respectively of stations 22, 23 and 24.

The arcuate contacts 99 of the selectors at stations 22 and 23 are connected by the conductor 182 with the positive terminals of the electro-magnets 109 and 147 of station 24 and by reason thereof, when the selector at either station 22 or 23 is operated and in use and the switch arm 98 of that station engaged with the contacts 99 and 100, both the selector and the actuator of station 23 are locked by the respective pawls 104 and 142 against operation.

No interlocking of stations 22 and 23 is provided or required during the operation of either, as each operates a separate group of counters through independent connections, and accordingly stations 22 and 23 may operate simultaneously without interference.

Station 24, however, actuates both groups 20 and 21 of counters and accordingly the arcuate contact 99 thereof is connected by the conductor 183 with the positive terminals of the electro-magnets 109 and 147 of both stations 22 and 23 so that when the selector of station 24 is operated and in use and the switch arm 98 of that station engaged with the contacts 99 and 100, the selectors and actuators of both stations 22 and 23 are locked by their respective pawls 104 and 142 against operation.

While we have shown and described our invention in a preferred form, we are aware that various changes and modifications may be made therein without departing from the principles of the invention, the scope of which is to be determined by the appended claims.

What is claimed is:

1. Counting facilities of the class described comprising a group of counters each having a series of counter wheels, a plurality of separate stations each of which is independently operable to select and operate the counters of the group individually, said counter wheels of each counter being operable optionally in forward or reverse directions by each station, each counter having a stepping device associated therewith by which the counter wheels of the counter are consecutively connected individually with the station by which it is selected and operated, each said station having a counter operator which is manually operable to operate the counter wheels individually, said counter operator having facilities which are effective in each interval between manual counter wheel operation thereof to operate the stepping device to connect another counter wheel with the station.

2. Counting facilities of the class described comprising a group of counters each of which has a series of consecutively operated counter wheels, a control station having a counter actuator by which variable step by step rotation is imparted to each counter wheel individually and said control station having a counter selector by which each counter is operatively connectible individually with the actuator, said actuator being operable to transmit a series of individualized, consecutive counter wheel operating cycles of electrical impulses, each cycle of which operates a different counter wheel and corresponds in the number of impulses to the number of steps of the step by step movement to be imparted to the counter wheel operated by that cycle, each counter having a stepping device associated therewith by which the counter wheels of the counter are consecutively connected individually with the station by which it is selected and operated, each said station having a counter operator which is manually operable to operate the counter wheels individually, said counter operator having facilities which are effective in each interval between manual counter wheel operation thereof to operate the stepping device to connect another counter wheel with the station.

WILLIAM H. RAMSELL.
EMERSON A. ARMSTRONG.

References Cited in the file of this patent

UNITED STATES PATENTS

| Number | Name | Date |
| --- | --- | --- |
| 2,528,394 | Sharpless et al. | Oct. 31, 1950 |
| 2,535,218 | Marble | Dec. 26, 1950 |